UNITED STATES PATENT OFFICE.

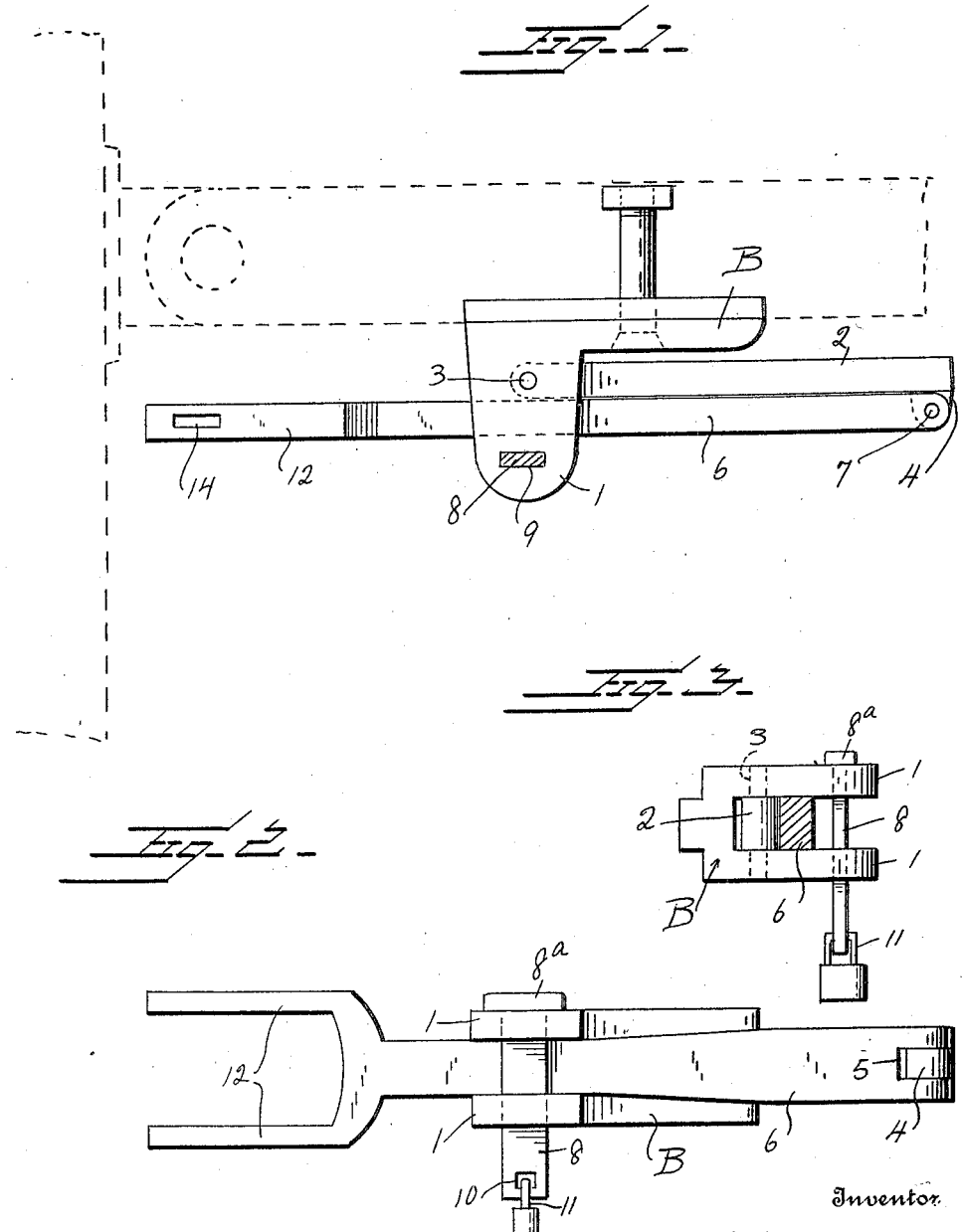

GEORGE LAWRENCE, OF TACOMA, WASHINGTON.

LOCK.

1,317,510.  Specification of Letters Patent.  Patented Sept. 30, 1919.

Application filed February 15, 1919. Serial No. 277,277.

*To all whom it may concern:*

Be it known that I, GEORGE LAWRENCE, a citizen of the United States, residing at Tacoma, in the county of Pierce and State of Washington, have invented certain new and useful Improvements in Locks, of which the following is a specification, reference being had to the accompanying drawings.

This invention relates to certain improvements in locks, and has relation more particularly to a device of this general character especially designed and adapted for use in connection with vehicles and preferably automobiles, and it is an object of the invention to provide a lock of this class having novel and improved means whereby the same may be effectively engaged with a wheel so that the possibility of the driving of the vehicle by an unauthorized person is substantially eliminated.

It is also an object of the invention to provide a novel and improved device of this character which, when not in use, may be readily folded or compacted to occupy a minimum of space, and which may be readily extended to properly engage a wheel of the vehicle.

The invention consists in the details of construction and in the combination and arrangement of the several parts of my improved lock whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in top plan of a lock constructed in accordance with an embodiment of my invention and in folded or inoperative position, the coacting key being shown in section;

Fig. 2 is a view in front elevation of the device as illustrated in Fig. 1; and

Fig. 3 is a view partly in elevation and partly in transverse section.

As disclosed in the accompanying drawings, B denotes an elongated body adapted to be bolted or otherwise secured to the axle of a vehicle, and preferably the front axle of an automobile.

An end portion of the body B is provided with a pair of outstanding and transversely spaced ears 1 and extending therebetween is an end portion of an arm 2 which is pivotally engaged with said ears through the medium of a pin 3. The opposite end portion of the arm 2 is provided with a lug 4 which extends within a kerf 5 formed within an end portion of a second arm 6 and which end portion of the arm 6 is pivotally engaged with the lug 5 through the medium of the pin 7. The arm 6 is folded back and upon the arm 2 and of a length to extend between the ears 1 and in order to maintain the arm 6 in such folded position a pin or key 8 is directed through the openings or slots 9 formed in the outer extremities of the ears 1. The pin or key 8 is provided at one end with a head $8^a$ and its opposite end portion is provided with an opening 10 through which the shackle 11 of a padlock key or the like is inserted for holding the pin or key 8 against displacement.

The opposite or outer end of the arm 6 is forked and the fingers or tines 12 thereof are adapted to straddle the spoke of a wheel when the arm 6 is extended so that said wheel will be held against rotation and the driving of the vehicle prevented. The free end portions of said fingers or tines 12 are provided with openings or slots 14 through which the pin or key 8 is adapted to be directed so that the device is maintained in locking engagement with the wheel.

From the foregoing description, it is thought to be obvious that a lock constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice except as hereinafter claimed.

I claim:

1. A vehicle lock comprising a body adapted to be secured to a stationary part of a vehicle, outstanding spaced ears carried by the body, an arm having an end portion extending between said ears and pivotally engaged therewith, a second arm pivotally engaged at one end portion with the opposite end portion of the first named arm, the opposite end portion of the second arm being provided with wheel engaging means, said second named arm being of a length to extend between the ears when swung back upon the first named arm, the outer end portions of the ears being provided with openings, and a key insertible through said openings for maintaining the arms in folded position.

2. A vehicle lock comprising a body adapted to be secured to a stationary part of a vehicle, an arm having an end portion extending between and pivotally secured to said ears, the outer extremities of the ears being provided with openings, a second arm having an end portion pivotally engaged with the opposite end portion of the first named arm, spaced fingers carried by the opposite end portion of the second arm for straddling the spoke of a wheel, the extremities of said fingers being provided with openings, and a key insertible through either the openings of the ears or the openings of the fingers.

In testimony whereof I hereunto affix my signature in the presence of two witnesses.

GEORGE LAWRENCE.

Witnesses:
J. R. McDOLE,
OSCAR PETERSON.

Copies of this patent may be obtained for five cents each, by addressing the "Commissioner of Patents Washington, D. C."